(12) United States Patent
Plichon (10) Patent No.: US 12,396,596 B2
(45) Date of Patent: Aug. 26, 2025

(54) MOLD WITH EASY-TO-GRIP REMOVABLE CONTAINERS AND STAND FOR SAME

(71) Applicant: SEB S.A., Ecully (FR)

(72) Inventor: Stéphane Plichon, Allonzier-la-Caille (FR)

(73) Assignee: SEB S.A. (FR)

( * ) Notice: Subject to any disclaimer, the term of this patent is extended or adjusted under 35 U.S.C. 154(b) by 319 days.

(21) Appl. No.: 17/801,047

(22) PCT Filed: Feb. 8, 2021

(86) PCT No.: PCT/EP2021/052938
§ 371 (c)(1),
(2) Date: Aug. 19, 2022

(87) PCT Pub. No.: WO2021/165080
PCT Pub. Date: Aug. 26, 2021

(65) Prior Publication Data
US 2023/0067009 A1    Mar. 2, 2023

(30) Foreign Application Priority Data
Feb. 21, 2020 (FR) ..................................... 2001766

(51) Int. Cl.
*A47J 43/20* (2006.01)
*A21B 3/13* (2006.01)

(52) U.S. Cl.
CPC .............. *A47J 43/20* (2013.01); *A21B 3/132* (2013.01)

(58) Field of Classification Search
CPC ............ A21B 3/132; A47J 37/01; A47J 43/20
See application file for complete search history.

(56) References Cited

U.S. PATENT DOCUMENTS 3,411,463 A * 11/1968 Moseres .................. A23G 9/26
                                                              D7/672
RE50,164 E * 10/2024 Viancin .................... A23P 30/10

FOREIGN PATENT DOCUMENTS

| DE | 1196595 B | 7/1965 | |
| DE | 20211821 U1 * | 1/2003 | ............ A21B 3/132 |
| KR | 20130013672 A | 2/2013 | |
| WO | 2007146271 A1 | 12/2007 | |

OTHER PUBLICATIONS

International Search Report for Application No. PCT/EP2021/052938 mailed Mar. 24, 2021, 2 pages.

* cited by examiner

Primary Examiner — James Sanders
(74) Attorney, Agent, or Firm — Lerner David LLP (57) ABSTRACT

A mold for preparation of food includes a stand having a receiving structure, enhancers, and at least one through-opening having an edge, and at least one removable container of height h configured for introducing into the opening. The container includes a bottom wall and a side wall extending from the bottom wall, the side wall and the bottom wall forming a cavity for holding food. The side wall of each container has an upper gripping zone that is unable to pass through the opening. The mold also includes; an annular line of cooperation where the container cooperates with the edge of the opening to support the container on the edge, and a lower stability zone that is able to pass through the opening.

17 Claims, 5 Drawing Sheets

MOLD WITH EASY-TO-GRIP REMOVABLE CONTAINERS AND STAND FOR SAME

CROSS-REFERENCE TO RELATED APPLICATIONS

The present application is a national phase entry under 35 U.S.C § 371 of International Application No. PCT/EP2021/052938 filed Feb. 8, 2021, which claims priority from French Application No. 2001766 filed Feb. 21, 2020, all of which are hereby incorporated herein by reference.

TECHNICAL FIELD

The present invention relates to the field of molds for food use and more particularly to molds for baking pastries such as muffins.

It should be noted that in this document, the terms "longitudinal," "transversal," "perpendicular," "parallel," "rotation," "horizontal," "vertical," "lower," "upper," "high," "low," "separating," "coaxial," "convex," "concave," "flat" used to describe the invention, refer to this invention when in use, when set on a horizontal surface.

PRIOR ART

In the field of food preparation, and more particularly of baking, molds are commonly used to shape and bake food such as cakes.

Conventional molds, known as muffin pans, have several receptacles or cups arranged on a holder, the whole forming a single mold with several cavities for receiving the pastry. Conventionally, these one-piece molds are made of stamped sheet metal, which may be covered with a non-stick coating. These molds come in a multitude of shapes. The advantage of multi-cup molds is that several cakes or recipes can be made simultaneously by filling all the cavities in the mold.

However, the drawback of these multi-cup molds is that unmolding is difficult because the cups are incorporated into the holder. The cups therefore cannot be handled separately but only simultaneously.

There are also multi-cup molds where each cup can be removed from a tray for easier unmolding. However, the drawback of these molds is that they do not ensure optimal cup stability, especially when taken out of the oven when the mold and the food it contains are hot. Indeed, the user has no means of grasping the hot cup.

Moreover, when the mold is cold, this instability is caused by the lack of space for the user's fingers. In fact, with these molds, when putting the cup in its tray, the user's fingers get in the way and the user lets go of the cup to position it in the tray. This leads to splatters since the user drops the cup, which shakes the food preparation and causes it to splash out of its cup.

The present invention thus aims to resolve all or part of the aforementioned drawbacks, in particular by proposing a stable, multi-cup mold in which the individual molds or cups are easier to grasp, thereby preventing overflow and finger burns.

The inventors have demonstrated that it is possible to use multi-cup molds with cups having a shape and size that create a gripping zone and a stability zone.

The invention provides at least one of the decisive advantages described below.

Advantageously, the mold according to the invention has cups that can be easily grasped. This makes it easier to fill each cup separately.

Another advantage offered by the invention is that the containers can be more easily grasped when the mold is removed from the hot oven. A user wearing oven mitts and whose movements are thus restricted will be able to easily grasp the cup by its gripping zone even if the mold is hot.

Another advantage of the present invention is that this particular arrangement of the container on the receiving structure or tray allows the hot air in the oven to move evenly around the cup and thus allows the food or the dish to cook more evenly.

Another advantage of the present invention is that each individual cup is removable, which makes handling much easier compared to handling the entire mold with all its cups. Everyone around the table can season their dish in its cup to their own taste. Different types of cakes can be made in the same batch.

Another advantage of the present invention is that cakes with different shapes can be made in the same batch using different cups.

Presentation of the Invention

The subject-matter of the invention is a mold intended for the preparation of food, in particular pastries, comprising
- a stand including a receiving structure which is a tray, enhancers and at least one through-opening having an edge;
- at least one removable container of height h intended to be introduced into the opening, the container comprising a bottom wall and a side wall extending from the bottom wall, the side wall and the bottom wall forming a cavity for holding food;

the side wall of each container has
an upper gripping zone that is unable to pass through the opening and has a height h1;
an annular line of cooperation where the container cooperates with the edge of the opening to support the container on the edge; and
a lower stability zone that is able to pass through the opening and has a height h2;
the height h1 is at least 25% of the height h of the container and does not exceed 45% of the height h of the container;
the annular line of cooperation defines the joint between the upper and lower zones; and
the area of the through-opening is equal to the area of the container cross-section at the annular line of cooperation.

Thus, the stand comprises a receiving structure which is a receiving tray, intended to receive, group together and support the containers, which are themselves intended to receive the food preparation. The structure allows all the elements of the mold to be attached to each other, particularly the containers. The stand and the container or containers are two separate elements, interlocking with one another. The stand has enhancers that make it possible to raise the containers and keep them away from the supporting surface on which the stand is set, such as a worktop or a drip tray or rack in an oven. Thus, the bottom wall of the containers does not come into contact with the worktop or with the oven racks when the containers are placed in the stand. Since direct contact with the oven rack is avoided, there is no direct transmission of heat by the metal elements of the oven, which could spread through the bottom wall and cause uneven baking. Thus, the risk of overcooking in the bottom of the containers is avoided. This advantageous arrangement allows the heat to spread all around the available surface of the container. Thus, baking takes place by heat diffused by the ambient air in the oven around the containers, which helps ensure that the food is evenly baked.

According to another feature of the invention, the annular line of cooperation cooperates in whole or in part with the edge of the opening.

According to another feature of the invention, the only contact surface of the removable container with the stand is the annular line of cooperation which cooperates in whole or in part with the edge of the opening, the container not being in contact with the surface of the receiving structure. The only contact of the container with the stand is the edge of the openings.

According to another feature of the invention, the enhancers are arranged laterally on each side of the stand. Advantageously, the enhancers support the weight of the receiving structure of the mold according to the invention with or without the removable containers.

According to another feature of the invention, the enhancers are present on no more than two sides of the receiving structure, preferably facing each other, and the other two sides are left free in order to allow air to circulate.

According to another feature of the invention, the enhancers are substantially L-shaped with feet resting on the worktop or the oven. The foot of the enhancer is advantageously arranged in a plane parallel to the plane containing the receiving structure.

According to another feature of the invention, the stand of the mold according to the invention with its receiving structure and enhancers is configured to raise the container with respect to the supporting surface on which the mold is set and to define an air blade between the bottom wall of the container and this supporting surface of the mold.

According to another feature of the invention, the stand of the mold according to the invention comprises an air circulation corridor arranged under the receiving structure. Such a configuration of the mold according to the invention, and in particular the presence of an air blade between the container and the surface on which the mold is placed, for example a worktop or the drip tray in the oven, makes it possible to sufficiently insulate the underside of the food preparation received in the container from the radiation coming from the bottom heating elements of the oven and thus to slow the baking and browning of the underside of the food preparation.

According to another feature of the invention, the enhancers have a height h3, this height h3 being greater than the height h2, the height h3 preferentially being at least 10% greater, preferably at least 15% greater than the value of the height h2. The height h3 corresponds to the sum of heights h2 and h4. Thus, the containers are raised and their bottom wall is kept free of any contact. The bottom wall is never in contact with any element once the container is installed on the mold stand. Thus, the bottom wall never touches any element of the oven or of the worktop or of the stand.

According to another feature of the invention, the mold according to the invention has a reservation zone with a height h4, extending from the supporting surface of the worktop to the bottom wall of the containers. The height h4 is present when the container is inserted into the through-hole. The height h4 is the difference h3−h2. Advantageously, this reservation zone accommodates the air blade and allows for air circulation, enabling the hot air to circulate better between the containers and to provide slow, even baking without creating a local hot spot by contact with the bottom wall, which would cause burned spots due to excessive heating.

According to another feature of the invention, the center of gravity of the container is situated above the annular line of cooperation when the side wall cooperates with the edge of the opening of the stand. The container's annular cooperation line cooperates in whole or in part with the perimeter of the edge of the opening in order to hold the container. Gravity ensures that the containers settle into the through-openings and cooperate in whole or in part with the annular line. The position of the center of gravity above the annular line allows a space to be reserved as an upper gripping zone.

According to another feature of the invention, the lower stability zone extends below the edge of the opening. The user can thus fill all the cups with a liquid preparation and arrange the filled cups in the stand without spilling them. When the container is inserted into the opening of the mold stand, the stability zone is then no longer in contact with the worktop or baking tray but is only in contact with the mold stand via the annular line of cooperation.

According to another feature of the invention, the upper gripping zone extends above the edge of the opening. This makes it easier to grasp the container because the user's fingers can fit between the receiving structure of the stand and the top of the side wall of the container. The user can then lift the container which can be easily detached from the stand because there are no retention elements holding the container to the stand.

According to another feature of the invention, each container has an unmolding angle α of at least 5°. Thus, the side walls have a slope angle α which facilitates unmolding when the container is turned over with its opening and cavity facing downwards. This unmolding angle α is preferably 10° in order to unmold a pastry.

According to another feature of the invention, each container has a tapering cross-section, between a minimum and a maximum, covering a variable area along a longitudinal axis (A) of the container, such that each container has a substantially frustoconical or truncated pyramid geometry. This geometric arrangement makes unmolding easier but also makes it possible to promote the circulation of heat around the containers.

According to another feature of the invention, the minimum cross-section of the container has an area that is smaller than the area of the opening. Thus, this difference in size between these two areas allows the container to slide naturally into the opening, i.e., by the force of gravity without the need for any external effort.

According to another feature of the invention, the maximum cross-section of the container has an area that is greater than the area of the opening. Thus, this difference in size between these two areas keeps the container from passing completely through the through-opening so that it is held by the edge of the opening.

According to another feature of the invention, the height h of the container is equal to the sum of the heights h1+h2.

According to another feature of the invention, the height h2 is greater than 15 mm, preferably greater than 20 mm.

According to another feature of the invention, the height h2 represents no more than 75% of the height h of the container and no less than 55% of the height h of the container.

According to another feature of the invention, each container may comprise a locking system with the receiving structure. This locking system can be in the form of notches (for example, a slot on the side wall for holding on the stand) or a system of stud and bayonet couplings (for example, short and long studs with notched bases to cooperate with bayonet). This makes it possible to stabilize the container in case of transverse or vertical movements of the stand.

According to another feature of the invention, each container is removable. Each cup is separate and can be removed individually because it is movable, which makes handling much easier than handling the entire mold with all its cups. The user can thus easily grasp one cup, tilt it and fill it with a ladle, for example.

According to another feature of the invention, the edge of the through-opening has an arrangement facilitating accommodation of the container, such as a rounded edge or a sloping face.

According to another feature of the invention, the stand and containers are made of a rigid material that holds its shape, such as metal, steel.

It can also be foreseen that the stand and the containers are made of stainless steel, silicone or aluminum. Advantageously, they will be covered with a non-stick coating. It can also be foreseen that the stand and the containers are made of different materials, such as a metal or wood stand and glass or ceramic containers.

According to another feature of the invention, the containers have a shape that enables them to be stacked in order to facilitate their storage.

According to another feature of the invention, the enhancers of the stand can be folded under the stand.

According to another feature of the invention, the enhancers of the stand can be disassembled and detached from the stand.

According to another feature of the invention, the receiving structure and the enhancers are a single continuous element.

BRIEF DESCRIPTION OF THE DRAWINGS

The following is a description of specific embodiments of the present invention, provided by way of non-limiting example. It will assist in better understanding the purposes, aspects and advantages of this invention, with reference to the appended drawings in which.

DESCRIPTION OF THE EMBODIMENTS

With reference to FIGS. 1 to 7, a mold 1 is proposed for the preparation of food, in particular pastries, essentially comprising a stand 2 and at least one container 7.

Figure 1:
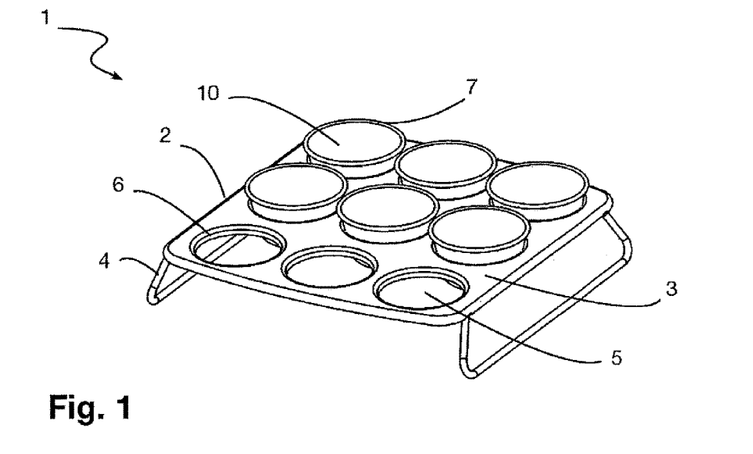
FIG. 1 is a perspective view of a mold according to a first exemplary embodiment of the invention.

FIG. 1 illustrates an example of a mold 1 according to the invention. It involves a pastry mold 1, particularly for muffins. The mold 1 has a stand 2 with a receiving structure 3, which is a receiving tray 3. The tray 3 has two enhancers 4 that are feet formed from a metal wire, supporting the weight of the tray 3. The enhancers are arranged laterally on each side of the stand 2. The tray 3 has six containers 7 that are substantially conical in shape. The tray 3 has nine openings 5, which according to the mold 1 in FIG. 1 are identical and circular in shape. These openings 5 are through-openings and pass through the surface of the tray 3. The openings 5 have an edge 6 and a through area equal to the area of the cross-section of the container 7 at an annular cooperation line 12 (visible in FIG. 3).

Six containers 7 are inserted into six of the nine through-openings 5 and their progress through the opening was stopped by the edge 6, when the containers 7 came into contact with the edge 6. This is a particularly advantageous technical arrangement, which allows the tray 3 to retain the containers 7.

Figure 2:
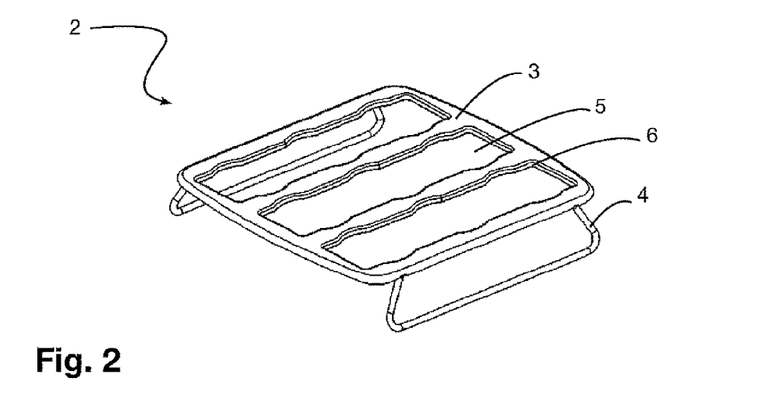
FIG. 2 is a perspective view of a mold stand according to an exemplary embodiment of the invention.

FIG. 2 illustrates an example of a variant of the stand 2 for another type of mold 1. Here the stand 2 has a receiving tray 3. The tray 3 has two enhancers 4 that are feet formed from a metal wire, supporting the weight of the tray. The enhancers are arranged laterally on each side of the stand 2. The tray 3 has three through-openings 5 substantially parallelepiped in shape, which according to the mold in FIG. 2 are identical.

Figure 3:
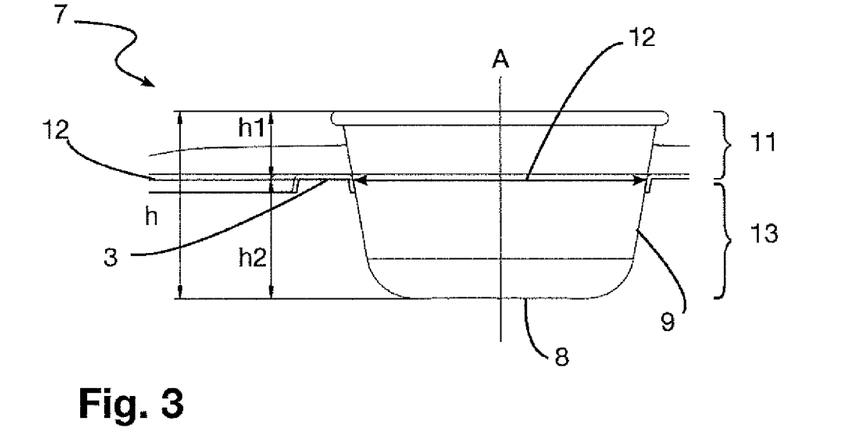
FIG. 3 is a sectional view of a container of the mold in FIG. 1 according to an exemplary embodiment of the invention.

FIG. 3 illustrates an example of a container 7 of height h used in the mold 1 in FIG. 1. This container 7 has a gripping zone 11 and a lower stability zone 13. At about ⅓ of the height of the container, starting from its top edge, the container has an annular line of cooperation 12. The gripping zone 11, of height h1, is advantageously situated above the annular line 12. The lower stability zone 13, of height h2, is advantageously situated below the annular line 12.

The container 7 also has a side wall 9 and a bottom wall 8 forming a cavity 10. The container 7 has a height h1 of about 1.3 cm representing about 30% of the total height h of about 4 cm of the container 7. The annular cooperation line 12 defines the joint between the upper zone 11 and the lower zone 13.

Figure 4:
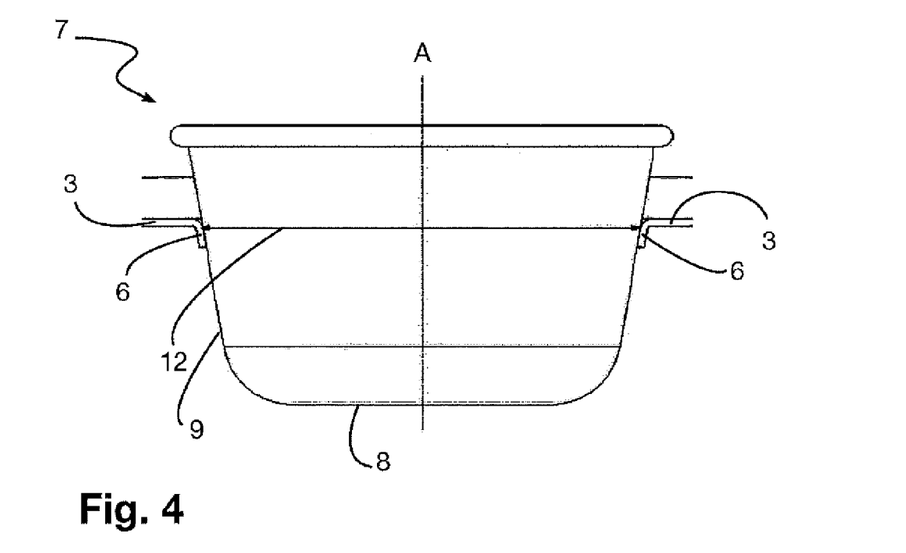
FIG. 4 is a sectional view of a container of the mold in FIG. 1 according to an exemplary embodiment of the invention.

FIG. 4 illustrates the container 7 of the mold in FIG. 1 according to an exemplary embodiment of the invention cooperating with the tray 3 of the mold 1. The container 7 is retained and held by the edge 6 of the tray 3 at its annular line 12. The bottom wall 8 and the side wall 9 extend below the annular line 12. The center of gravity of the container is situated above the annular line of cooperation 12 when the side wall cooperates with the edge of the opening of the stand.

Figure 5:
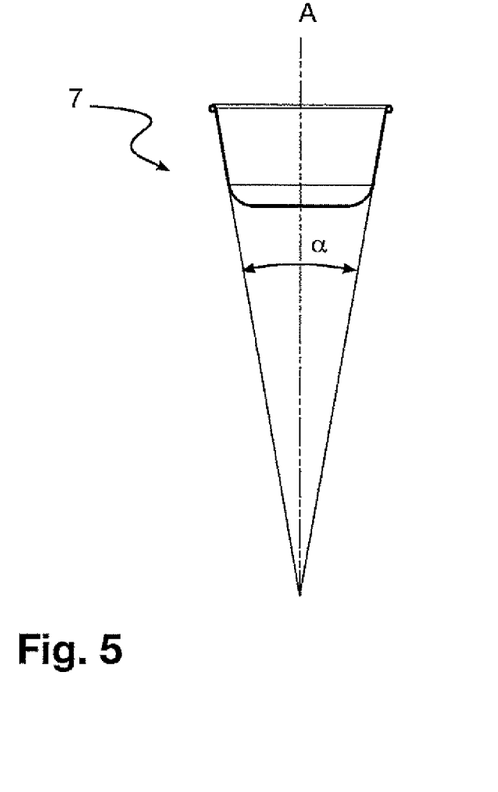
FIG. 5 is a sectional view of a container of the mold in FIG. 1 according to an exemplary embodiment of the invention.

FIG. 5 illustrates the container 7 of the mold 1 in FIG. 1 according to an exemplary embodiment of the invention with its unmolding angle α. The container 7 has an unmolding angle α of 10°.

Figure 6:
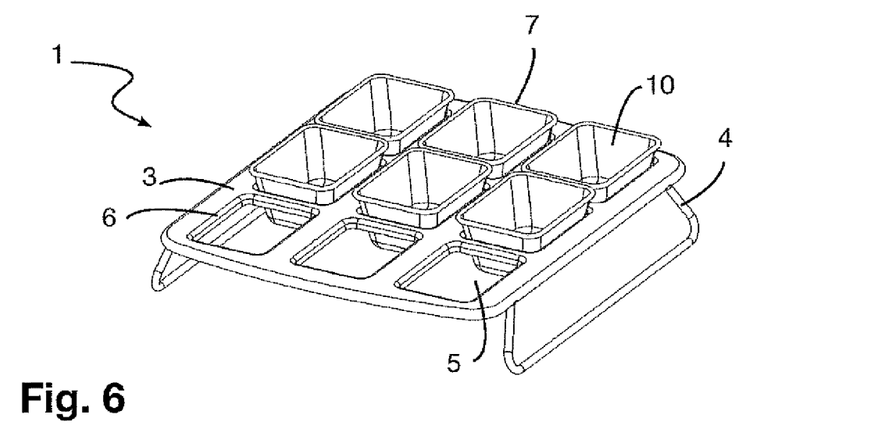
FIG. 6 is a perspective view of a mold according to a second exemplary embodiment of the invention.

FIG. 6 illustrates a second exemplary embodiment of a mold 1 according to the invention. The tray 3 has nine containers 7 with a substantially truncated pyramid shape. The tray 3 has nine openings 5, which according to the mold 1 in FIG. 1 are identical and rectangular in shape.

Figure 7:
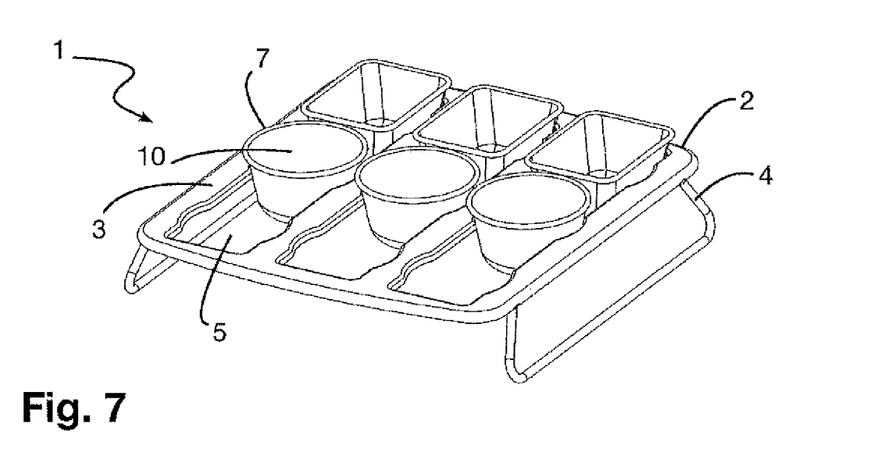
FIG. 7 is a perspective view of a mold according to a third exemplary embodiment of the invention.

FIG. 7 illustrates a third exemplary embodiment of a mold 1 according to the invention. The tray 3 has six containers 7 of different shapes, either substantially truncated pyramid-shaped or substantially frustoconical. The containers 7 have a substantially rectangular section.

The tray 3 has three openings 5, which according to the mold 1 in FIG. 7 are identical and substantially rectangular in shape.

Figure 8:
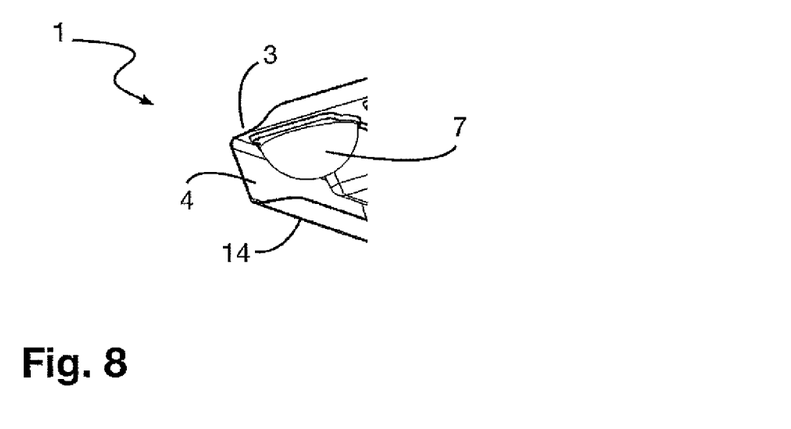
FIG. 8 is a partial perspective view of a mold according to a fourth exemplary embodiment of the invention.

FIG. 8 illustrates in part a fourth exemplary embodiment of a mold 1 according to the invention. The receiving stand of a mold 1 according to the invention. The receiving stand is a tray 3 comprising L-shaped enhancers 4 with feet 14.

The feet 14 are in contact with the worktop or the baking sheet and thus improve the stability of the mold when it is placed on a surface.

Figure 9:
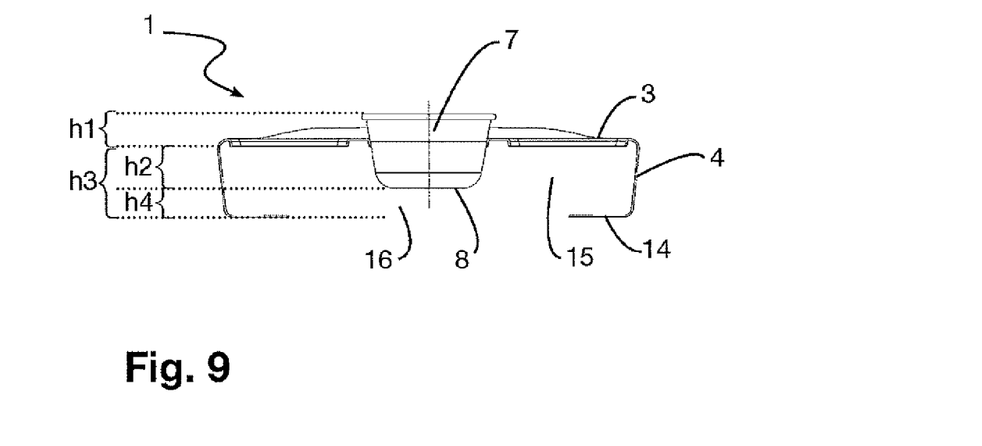
FIG. 9 is a sectional view of a mold according to a fifth exemplary embodiment of the invention.

FIG. 9 illustrates in part a fifth exemplary embodiment of a mold 1 according to the invention. The receiving stand is a tray 3 comprising L-shaped enhancers 4 with feet 14. The feet 14 are arranged in a plane parallel to the plane of the tray 3. The enhancers 14 [sic: 4] have a height h3, which is greater than the height h2, h2 representing approximately ⅓ of h3. The receiving structure 3 of the mold 1 comprises an air circulation corridor 15 arranged under the receiving structure 3. The mold 1 has a reservation zone 16 of height h4 that extends from the surface of the worktop to the bottom wall 8. The height h3 corresponds to the sum of heights h2 and h4. This reservation zone 16 allows for the circulation of an air blade in the corridor 15, enabling the hot air to circulate better between the containers 7 and to provide slow, even baking without creating a local hot spot by contact with the bottom wall 8, which would cause burned spots due to excessive heating.

When in use, a user can, for example, grasp the containers 7 to pour a food preparation into them. The user will grasp each container 7 by its gripping zone 11 or by the side wall 9 and fill the cavity 10 with the food preparation. Then the user will place the filled containers in any opening 5 of the tray 3, approximately following the direction of a longitudinal axis (A). The container 7 then comes into contact with the edge 6 of the openings 5 and when the annular line 12 comes into contact with the edge 6, said line cooperates with the edge 6 and stops the longitudinal movement of the container 7. The user can then release the container 7 and repeat this operation for each container in order to fill all the openings 5 of the mold 1. Once placed in the openings 5 of the stand 2, the containers 7 are no longer in contact with the worktop but are supported by the stand 2 via the annular line of cooperation 12 cooperating with the edge 6. Thus, the containers 7 are raised or elevated and their bottom wall 8 is kept free, without contact with any element once the container 7 is installed on the stand 2 of the mold 1. Thus, the bottom wall 8 never touches any element of the oven or of the worktop or of the stand 2.

Depending on the recipe followed, the user can heat the mold 1 or chill it. The specific characteristics of the connection between the container 7 and the openings 5 make it possible to guarantee the stability of the mold 1, stand and container assembly, under conditions of expansion (baking) or contraction (cooling) of the mold 1. When the baking or chilling is done, the user can disassemble the containers 7 from the stand 2 by easily grasping them by their gripping zone, pulling upwards in the direction of the longitudinal axis (A). The containers are thus removed from the stand 2. The user can then unmold the dish (for example, the cake) with no risk of damaging it.

Although the invention has been described in relation to particular exemplary embodiments and applications, it is obviously in no way limited thereto.

Modifications can still be made, specifically regarding the arrangement and constitution of the various elements or by substituting equivalent techniques, without departing from the field of protection of the invention.

The invention claimed is:

1. A mold for preparation of food, comprising:
   a stand including a tray, enhancers and at least one through-opening having an edge;
   at least one removable container of height h intended to be introduced into the through-opening, the container comprising a bottom wall extending along a first plane and a side wall extending from the bottom wall, the side wall and the bottom wall forming a cavity for holding food;
   the side wall of each container has an upper gripping zone that is unable to pass through the through-opening and has a height h1, an annular line of cooperation wherein the container cooperates with the edge of the through-opening to support the container on the edge, and a lower stability zone that is able to pass through the through-opening and has a height h2; wherein
   the height h1 is at least 25% of the height h of the container and does not exceed 45% of the height h of the container;
   the annular line of cooperation defines the joint between the upper and lower zones; and
   the area of the through-opening is at least equal to the area of the container cross section of the container at the annular line of cooperation,
   wherein the tray and the container are configured to be placed within a heated chamber capable of baking the food within the container, and
   wherein the enhancers have a height h3 that is greater than the height h2,
   wherein the tray includes a foot extending from one of the enhancers along a second plane parallel to the bottom wall of the container and spaced apart from the bottom wall by a height h4,
   wherein the height h4 is the difference between the height h3 and the height h2, and
   wherein the edge includes a curved segment extending from a substantially linear segment of the edge, the curved and substantially linear segments extending parallel to the first plane.

2. The mold according to claim 1, wherein the center of gravity of the container is situated above the annular line of cooperation when the side wall cooperates with the edge of the through-opening of the stand.

3. The mold according to claim 1, wherein the lower stability zone extends below the edge of the through-opening.

4. The mold according to claim 1, wherein an upper stability zone extends above the edge of the through-opening.

5. The mold according to claim 1, further comprising a reservation zone extending from the second plane to the bottom wall of the container.

6. The mold according to claim 1, wherein each container has a tapering cross-section, between a minimum and a maximum, covering a variable area along a longitudinal axis of the container, such that each container has a substantially frustoconical or truncated pyramid geometry.

7. The mold according to claim 6, wherein the minimum cross section of the container has an area that is smaller than the area of the through-opening.

8. The mold according to claim 5, wherein the maximum cross section of the container has an area that is greater than the area of the through-opening.

9. The mold according to claim 1, wherein the height h of the container is equal to the sum of the heights h1+h2.

10. The mold according to claim 1, wherein the height h2 is greater than 15 mm, preferably greater than 20 mm.

11. The mold according to claim 1, wherein each container comprises a locking system with the tray.

12. The mold according to claim 1, wherein the stand and each container are made of steel.

13. The mold according to claim 1, wherein the through-opening is configured to simultaneously accommodate at least two removable containers each having a profile defining a different shape.

14. The mold according to claim 1, wherein the one of the enhancers and the foot define an L-shape.

15. The mold according to claim 1, wherein the height h3 being at least 15% greater than the value of the height h2.

16. The mold according to claim 1, wherein the curved segment is a first curved segment extending from a first end of the substantially linear segment, and wherein the edge further includes a second curved segment extending from a second end of the substantially linear segment opposite the first end.

17. The mold according to claim 16, wherein the substantially linear segment is a first substantially linear segment extending from a first end of the first curved segment, and wherein the edge further includes a second substantially linear segment extending from a second end of the first curved segment opposite the first end of the first curved segment.

* * * * *